US010495027B1

(12) United States Patent
Hodge

(10) Patent No.: US 10,495,027 B1
(45) Date of Patent: Dec. 3, 2019

(54) TRIDYNE IGNITION AND PRESSURIZATION SYSTEM FOR HYPERSONIC VEHICLES

(71) Applicant: Northrop Grumman Systems Corporation, Falls Church, VA (US)

(72) Inventor: Kathleen F. Hodge, Alexandria, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 394 days.

(21) Appl. No.: 15/382,791

(22) Filed: Dec. 19, 2016

(51) Int. Cl.
| F02K 9/50 | (2006.01) |
| F02K 9/62 | (2006.01) |
| F02K 9/60 | (2006.01) |
| F02C 7/224 | (2006.01) |
| F02C 7/22 | (2006.01) |
| F02K 7/10 | (2006.01) |
| F02K 7/08 | (2006.01) |

(52) U.S. Cl.
CPC ............... *F02K 9/50* (2013.01); *F02C 7/22* (2013.01); *F02C 7/224* (2013.01); *F02K 7/08* (2013.01); *F02K 7/10* (2013.01); *F02K 9/605* (2013.01); *F02K 9/62* (2013.01); *F05D 2220/80* (2013.01); *F23K 2301/204* (2013.01); *F23N 2021/04* (2013.01)

(58) Field of Classification Search
CPC .... F02C 7/22; F02C 7/224; F02K 9/50; F02K 7/08; F02K 7/10; F23N 2021/04; F23K 2301/204
See application file for complete search history.

(56) References Cited

U.S. PATENT DOCUMENTS

| 5,711,146 A * | 1/1998 | Armstrong .......... C01B 13/0214 23/305 R |
| 7,703,273 B2 | 4/2010 | Spanjers et al. |
| 2007/0075158 A1* | 4/2007 | Pelletier ................ B05B 1/3436 239/11 |
| 2010/0089574 A1* | 4/2010 | Wideman .................. E21B 7/14 166/272.1 |
| 2011/0185748 A1* | 8/2011 | Fuchs ....................... F17C 9/02 62/50.2 |
| 2012/0198818 A1* | 8/2012 | Boudier .................... F02K 9/50 60/259 |

(Continued)

OTHER PUBLICATIONS

Chakroborty, S. et al; Development and optimization of a tridyne pressurization system for pressure fed launch vehicles; In Proceedings of 42nd AIAA/ASME/SAE/ASEE Joint Propulsion Conference and Exhibit, Sacramento, California, pp. 9-12. 2006.

(Continued)

*Primary Examiner* — William H Rodriguez
*Assistant Examiner* — Kyle Robert Thomas
(74) *Attorney, Agent, or Firm* — McCracken & Gillen LLC

(57) ABSTRACT

A system for providing ignition and pressurization of hypersonic vehicles is disclosed. The system combines the pressurization, barbotage and ignition functions into a single system saving mass and volume and simplifying the hypersonic vehicle plumbing. A monopropellant fuel such as Tridyne is used to pressurize a fuel tank, warm the fuel as it enters fuel injectors, and provide barbotage of the fuel just prior to its injection into a combustion chamber.

16 Claims, 2 Drawing Sheets

(56) References Cited

U.S. PATENT DOCUMENTS

| | | | | |
|---|---|---|---|---|
| 2013/0239544 | A1* | 9/2013 | Sisk | F02K 9/50 |
| | | | | 60/204 |
| 2013/0340407 | A1* | 12/2013 | Fisher | F02K 9/58 |
| | | | | 60/204 |
| 2016/0290284 | A1* | 10/2016 | Caratge | F02K 9/50 |
| 2016/0377028 | A1* | 12/2016 | Wickham | F02K 7/14 |
| | | | | 60/39.5 |

OTHER PUBLICATIONS

De Groot, W. et al; Chemical microthruster options; National Aeronautics and Space Administration, 1996; See p. 7, discusses Tridyne for ignition and pressurization.

Reed, B.D. et al; Testing of a 2.2-N triconstituent gas thruster; AIAA Paper 1998 3668; 1998; pp. 1-14.

Cohen, B. S. et al; Optimization of a small satellite tridyne propulsion system; 2014 IEEE Aerospace Conference, Big Sky, MT; 2014, pp. 1-20.

Mueller, J. M. et al; Design of Tridyne Pressurization System for Liquid Oxygen/Polybutadiene Hybrid Rocket Motors; 1991; AIAA/SAE/ASME; 27th Joint Propulsion Conference, Jun. 24-26, 1991; Sacramento, CA.

Lee, J. et al; Challenges in Fuel Injection for High-Speed Propulsion Systems; AIAA Journal vol. 53, No. 6 Jun. 2015; pp. 1405-1423.

Barber, H. E. et al; Microthrusters employing catalytically reacted $N_2$—$O_2$—$H_2$ gas mixtures, Tridyne; Journal of Spacecraft and Rockets vol. 8, No. 2; Feb. 1971; pp. 111-116.

\* cited by examiner

TRIDYNE IGNITION AND PRESSURIZATION SYSTEM FOR HYPERSONIC VEHICLES

BACKGROUND

The invention relates generally to hypersonic ignition systems and more particularly to improving packaging efficiency and reducing weight in a hypersonic vehicle while meeting logistics constraints for an operational system. A paramount logistical consideration is that the integrated weapon and ignition system must be tactically compliant and meet Insensitive Munition (IM) requirements.

Hypersonic vehicles are generally defined as vehicles that operate at speeds higher than Mach 5. There are a number of challenges in operating at this speed. Achieving high supersonic and hypersonic speeds is commonly done using a ramjet or scramjet engine. However, since these engines cannot provide thrust at zero airspeed, an assisted take-off is used, requiring that ignition of the ramjet or scramjet engine take place when the vehicle is operating at supersonic speeds or above. Consistent, reliable ignition of fuel at these speeds has been problematic.

For hypersonic vehicles, cold-start refers to the situation immediately following boost to take-over Mach number conditions (typically around Mach 3 for Ramjets and Mach 5 for Scramjets) and the establishment of airflow through the engine. Prior to ignition, the liquid hydrocarbon fuel is still cold and is not sufficiently reactive to self-sustain combustion. The ignition system must therefore supply both initial ignition energy as well as sustaining energy until the fuel absorbs enough heat for the combustion process to be self-sustaining. For ground tests and early flight testing, this problem has been overcome by the use of an igniter fuel, such as pyrophoric gaseous silane ($SiH_4$), TEA/TEB (a mixture of triethylaluminum and triethylborane), or gaseous Ethylene. These serve to overcome the cold start problem, however, none of the options is logistically suitable for tactical weapon applications. Gaseous Ethylene requires a spark ignition system for cold start; it is highly flammable and is not expected to meet IM requirements. TEA/TEB and Gaseous Silane are difficult to store long term, since they are pyrophoric (undergoes spontaneous ignition in air), highly toxic, and can spontaneously ignite at temperature less than 130° F. Both ignition sources present storage and handling problems and TEA/TEB must be stored in Nitrogen or Argon. Tactical weapons are typically designed to be stored at temperatures from −40° F. to +160° F.

In addition to ignition systems, hypersonic vehicles have other systems that need a supply of gas, including pressurization systems and barbotage systems. Pressurization systems in a hypersonic vehicle are used, for example, to improve the functioning of fuel pumps by providing a constant pressure inlet conditions to the pump.

A barbotage, or effervescent atomization system involves introducing a small amount of high-velocity gas into a very low velocity liquid, leading to turbulent two-phase flow that can improve penetration and vaporization of the fuel jet spray. The difference in the densities of liquid and the gas and the shear interaction between the two phases help break the liquid into smaller droplets and reduce the flow dimensions for the liquid, atomizing the liquid fuel so that it is injected as very fine droplets. This complex phenomenon of supersonic combustion involves turbulent mixing, shock interaction and heat release in supersonic flow.

In the prior art, separate sources have been used to supply these systems, adding weight arising from duplication of equipment in addition to complex wiring and piping.

Thus, a need exists for an ignition and pressurization system for a hypersonic vehicle that has reduced weight and complexity. There is also a need for an ignition and pressurization system that is, volumetrically and resource efficient.

SUMMARY

According to the present invention, an ignition system for hypersonic vehicles combines the pressurization, barbotage and ignition systems into a single system saving mass and volume and simplifying the vehicle plumbing. A monopropellant fuel such as Tridyne is used to supply all three systems.

The invention in one implementation encompasses a hypersonic ignition system including a first tank for holding a hydrocarbon fuel; a plurality of fuel injectors for injecting the hydrocarbon fuel into a combustion chamber; a second tank for holding a Tridyne gas; a catalyst bed operatively coupled to the second tank for reacting with and warming the Tridyne gas; a pressurization system operatively coupled to the catalyst bed for using the warmed Tridyne gas to pressurize the first tank and an ignition and barbotage system operatively coupled to the catalyst bed for providing warmed Tridyne gas to the plurality of fuel injectors.

In a further embodiment, the hypersonic ignition system includes a fuel pump for pumping the hydrocarbon fuel from the first tank to the plurality of fuel injectors and the fuel pump may be located inside the first tank.

In another embodiment, the ignition and barbotage system injects the warmed Tridyne gas through a passage line in the center of each fuel injector to pre-heat the fuel, and the passage line ends in a mixing zone within the fuel injector such that the Tridyne mixes with the hydrocarbon fuel prior to exiting the fuel injector.

In yet another embodiment, the first tank further comprises an internal bladder. Further, the pressurization system pressurizes the first tank by injecting the warmed Tridyne gas into an ullage space between the first tank and the internal bladder.

In an embodiment, the second tank is located inside the first tank.

In an embodiment, the Tridyne gas further comprises a monopropellant comprising Gaseous Helium (He) or Nitrogen ($GN_2$), Gaseous Hydrogen ($GH_2$) and Gaseous Oxygen (GOX). In a further embodiment, the $GH_2$ further is approximately 2 to 4% by mass of the monopropellant and GOX further is approximately 18 to 24% by mass of the monopropellant.

In another embodiment, the catalyst bed is a cavity filled with a catalyst material which the Tridyne gas is passed over to activate the $GH_2$ and GOX, heating the He or $GN_2$ gas. In an embodiment, the catalyst material further includes a noble metal such as gold, silver, mercury, platinum, palladium, iridium, rhodium, ruthenium and osmium. Alternatively, the catalyst bed further includes a catalyst of platinum, lead and rhodium impregnated on one or more alumina pellets approximately ⅛ inch in diameter.

In yet another embodiment, the second tank is operatively coupled to the catalyst bed by a ball valve. In further embodiments, an output of the catalyst bed is operatively coupled to the first tank and the ignition system by a three-way valve; and a regulator is operatively coupled between the catalyst bed and the three-way valve.

DESCRIPTION OF THE DRAWINGS

Features of example implementations of the invention will become apparent from the description, the claims, and the accompanying drawings in which:

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1A:
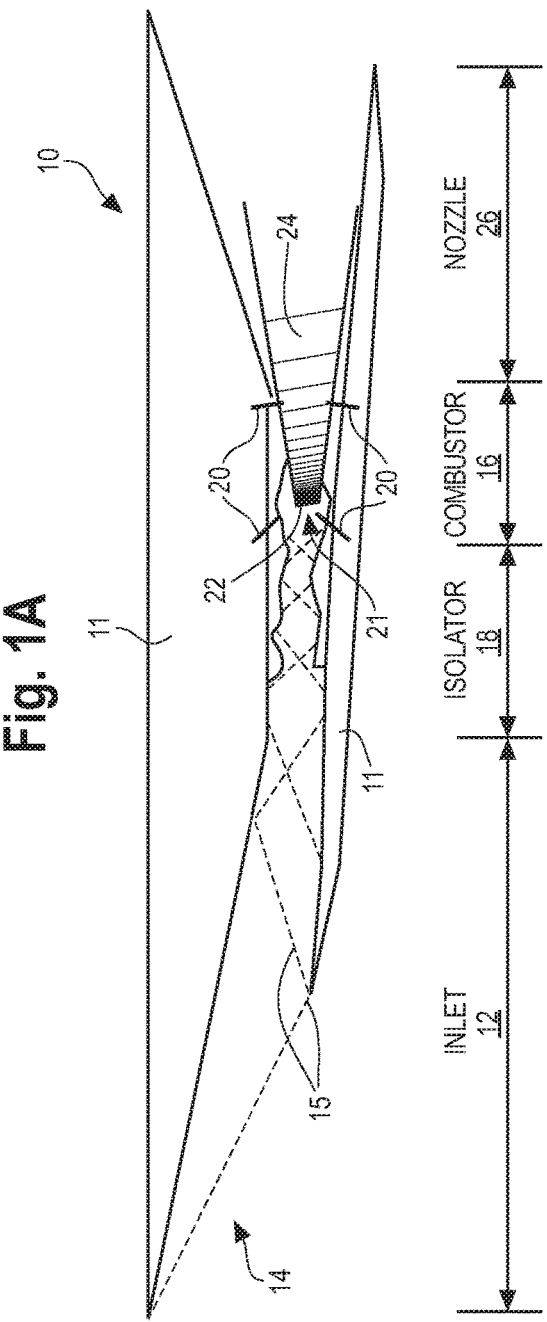
FIG. 1A is a schematic cross-section diagram of the flow path of a hypersonic vehicle.

FIG. 1A is a schematic cross-section diagram of an ignition flow path for a ramjet 10 in a hypersonic vehicle. It demonstrates where the fuel system components 11 would reside relative to a combustion flow-path. Inlet 12 provides for air in-take 14 into ramjet 10. As the air enters inlet 12, it forms a shock wave, represented by dashed lines 15. The shock wave passes through isolator 18, which is a short duct between inlet 12 and combustor 16 that serves to alleviate the problem of upstream propagation of disturbances generated by heat-release in combustor 16. These disturbances can affect the operation of inlet 12 by disrupting air flow. Fuel injectors 20 are located at several stations through combustor cavity 21 and combustor 16, where mixing, ignition, and combustion occur. The injectors 20 and combustor cavity 21 are part of the combustor 16. Ignition is represented at 22, resulting in exhaust 24 which is accelerated by nozzle 26 to provide thrust.

Figure 1B:
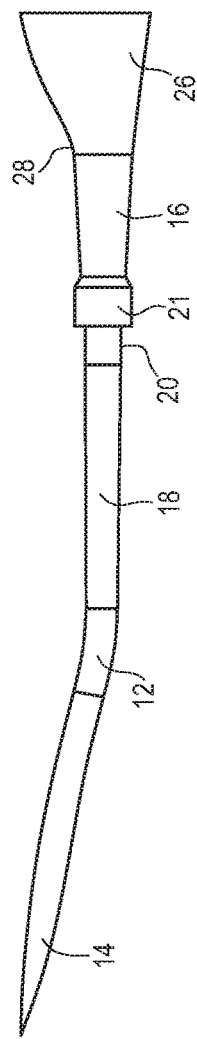
FIG. 1B is a schematic diagram of flow path components.

The schematic diagram of FIG. 1B represents flow path components according to the present invention. Air 14 enters inlet 12, is compressed and passes into isolator 18 as described above before entering the combustion chamber to mix with the fuel. The fuel is injected through multiple injection points 20 within the combustor cavity 21 and combustor 16. Combustion occurs in the combustor 16 and the exhaust passes through combustor exit 28 and is accelerated out the nozzle 26.

Although a ramjet has been discussed above, principles of the invention are equally applicable to a scramjet or other forms of air breathing jet engines. A ramjet decelerates the air to subsonic velocities before combustion, while airflow in a scramjet is supersonic throughout the entire engine. This allows the scramjet to operate efficiently at extremely high speeds.

Figure 2:
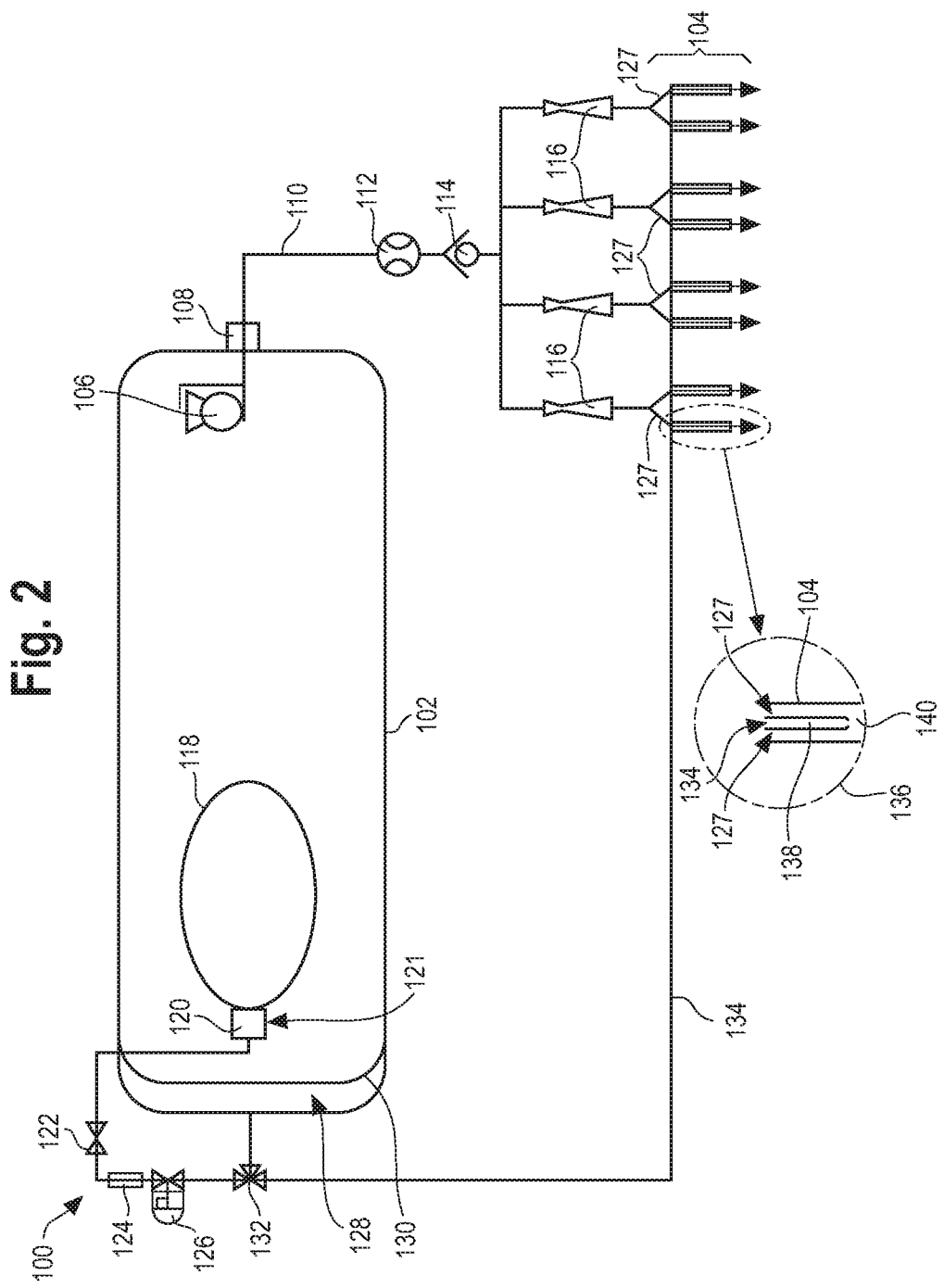
FIG. 2 is a schematic diagram of a Tridyne Ignition and Pressurization System.

An ignition system 100 according to the present invention is shown schematically in FIG. 2. Fuel tank 102 provides fuel to fuel injectors 104 for a ramjet or scramjet engine, as shown at 20 in FIG. 1. Although eight injectors are shown, any appropriate number based on design needs could be used. In an embodiment, fuel tank 102 contains JP-10, but any suitable hydrocarbon fuel could be used. Fuel pump 106 pumps the fuel through valve 108 and fuel line 110 to flow meter 112. In an embodiment, fuel pump 106 is a positive displacement vane-style pump to achieve the high outlet pressures needed to keep the fuel above its critical pressure. It is positioned inside tank 102 for cooling purposes. A relief valve is added downstream of the pump (not shown) to guard against possible over-pressurization if a blockage were to occur. From flow meter 112, the fuel passes through check valve 114 which prevents fuel vapors from migrating back into the fuel tank 102. The fuel flow is then directed through cavitating venturies 116 which assure a constant mass flow rate and finally to fuel injectors 104. Although four cavitating venturies are shown, any appropriate number could be used based on design needs.

Although specific elements of a fuel injection system have been described, one of ordinary skill in the art would understand that the apparatus of FIG. 2 is representative. For example, orifices or other flow devices could be used instead of cavitating venturies to regulate fuel flow upstream of the injectors.

A tank 118 provides gas for ignition, barbotage and pressurization needs in ignition system 100. In an embodiment, tank 118 contains Tridyne, a monopropellant made of an inert gas, a fuel and an oxidizer. The monopropellant is a chemical substance that releases energy through exothermic chemical decomposition, through the use of a catalyst to react the fuel and oxidizer so as to heat the inert gas. In an embodiment, Tridyne is an inert gas consisting of Gaseous Helium (He) or Nitrogen ($GN_2$) with a small amount of a fuel in the form of Gaseous Hydrogen ($GH_2$) and an oxidizer in the form of Gaseous Oxygen (GOX) added. In particular, $GH_2$ would comprise from 2 to 4% and GOX would comprise from 18 to 24% by mass of Tridyne, with the remainder of the mixture being He or GN2. In an embodiment, other inert gases for example, argon, xenon, krypton or a mixture thereof could be used. The fuel could also be for example, methane, ethane or a mixture while the oxidizer could be, for example air or oxygen difluoride or a mixture thereof.

When Tridyne is passed over a catalyst, the $GH_2$ and GOX combust and warm the gas. The amount of $GH_2$ and GOX in the Tridyne mixture is tailored such that it is not combustible without the catalyst, resulting in a system that meets standard tactical system temperature range, handling, and Insensitive Munitions (IM) requirements for stable storage, transportation and use in extreme environments.

An isolation valve 120 is used to control the releasing of Tridyne from tank 118 during operation and an integrated fill and drain valve 121 is used to fill the tank and, if necessary, drain the tank prior to operation. Tridyne is released from tank 118 through isolation valve 120 to ball valve 122. Valve 122 supplies Tridyne gas to catalyst bed 124, which triggers the combustion of $GH_2$ and GOX and warms the Tridyne gas. Regulator 126 provides nearly constant outlet pressure (±5%) to pressurize the ullage space 128 above fuel filled bladder 130 through three way valve 132. This ensures proper fuel pump 106 inlet conditions. In an embodiment, fuel tank 102 is pressurized through the use of an internal bladder 130, although any appropriate mechanism could be used.

The warmed Tridyne gas is also sent to fuel injectors 104 through line 134 to assist in cold start of the engine by warming the fuel by convection prior to injecting it into the fuel at to act as a barbotage gas. In an embodiment, a slightly Oxygen rich mix of Tridyne (with a higher concentration of GOX than GH2) can pre-oxidize the fuel to enhance combustion with the air after injection into the combustor.

Barbotage systems are used in hypersonic vehicles to atomize cold liquid hydrocarbon fuel for combustion by injecting a small amount of air or an inert gas into the fuel just prior to injection into the engine in order to aid combustion. According to the present invention the hydrocarbon fuel is injected into each fuel injector 104 as shown in more detail in close-up 136. Fuel injector 104 receives fuel through lines 127. Tridyne gas enters injector passage line 138 and warms the surrounding fuel within injector 104. The Tridyne gas then enters mixing zone 140 along with the pre-heated fuel. In mixing zone 140, gas bubbles into the liquid fuel. The two-phase flow is then injected into a ramjet or scramjet combustor cavity 21 (FIG. 1B) where it combusts with incoming air.

In an alternative embodiment, Tridyne gas is used for barbotage without being passed over catalyst bed 124 by using a three-way valve in place of ball valve 122. An additional line exiting the three-way valve provides Tridyne gas from tank 118 directly to fuel injectors 104. In this embodiment, warmed Tridyne gas in line 134 is injected into combustor cavity 21 of FIG. 1B upstream of fuel injectors 20.

Hypersonic ignition system 100 of FIG. 2 combines the pressurization, barbotage and ignition systems into a single system, saving mass and volume and simplifying the hypersonic vehicle plumbing. As a pressurant gas the catalyzed Tridyne expands the helium through added heat, allowing for a 50% reduction in tank mass/volume over, for example, a typical helium or nitrogen gas pressurization system. For barbotage, the gas is injected into the fuel either with or without passing through a catalyst bed. Barbotage injection of liquid hydrocarbon fuel with Tridyne has a definite advantage in terms of the breakup of droplets for better mixing with the supersonic air stream in the combustor and combustion enhancement. Ignition of the Fuel/Air mixture in the combustor is aided in two ways: first through the barbotage system which increases liquid fuel atomization; and second through the injection of catalyzed Tridyne into the combustor which warms the cold fuel during initial engine start-up (or during a re-ignition after a coast period when the chamber may have cooled).

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one example orientation of the apparatus 100, for explanatory purposes.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A hypersonic ignition system, comprising:
a first tank for holding a hydrocarbon fuel;
a plurality of fuel injectors for injecting the hydrocarbon fuel into a combustion chamber;
a second tank for holding a Tridyne gas;
a catalyst bed operatively coupled to the second tank for reacting with and warming the Tridyne gas;
a pressurization system operatively coupled to the catalyst bed for using the warmed Tridyne gas to pressurize the first tank; and
an ignition and barbotage system operatively coupled to the catalyst bed for providing warmed Tridyne gas to the plurality of fuel injectors.

2. The hypersonic ignition system of claim 1, further comprising a fuel pump for pumping the hydrocarbon fuel from the first tank to the plurality of fuel injectors.

3. The hypersonic ignition system of claim 2, wherein the fuel pump is located inside the first tank.

4. The hypersonic ignition system of claim 2, wherein the ignition and barbotage system injects the warmed Tridyne gas through a passage line in the center of each fuel injector to pre-heat the hydrocarbon fuel.

5. The hypersonic ignition system of claim 4, wherein the passage line ends in a mixing zone within the fuel injector such that the Tridyne mixes with the hydrocarbon fuel prior to exiting the fuel injector.

6. The hypersonic ignition system of claim 1, wherein the first tank further comprises an internal bladder.

7. The hypersonic ignition system of claim 6, wherein the pressurization system pressurizes the first tank by injecting the warmed Tridyne gas into an ullage space between the first tank and the internal bladder.

8. The hypersonic ignition system of claim 1, wherein the Tridyne gas further comprises a monopropellant comprising Gaseous Helium (He) or Nitrogen ($GN_2$), Gaseous Hydrogen ($GH_2$) and Gaseous Oxygen (GOX).

9. The hypersonic ignition system of claim 8, wherein the $GH_2$ further comprises approximately 2 to 4% by mass of the monopropellant and GOX further comprises approximately 18 to 24% by mass of the monopropellant.

10. The hypersonic ignition system of claim 8, wherein the catalyst bed further comprises a cavity filled with a catalyst material which the Tridyne gas is passed over to activate the $GH_2$ and GOX, heating the He or $GN_2$ gas.

11. The hypersonic ignition system of claim 10, wherein the catalyst material further comprises a noble metal such as gold, silver, mercury, platinum, palladium, iridium, rhodium, ruthenium and osmium.

12. The hypersonic ignition system of claim 10, wherein the catalyst bed further comprises a catalyst of platinum, lead and rhodium impregnated on one or more alumina pellets approximately ⅛ inch in diameter.

13. The hypersonic ignition system of claim 1, wherein the second tank is operatively coupled to the catalyst bed by a ball valve.

14. The hypersonic ignition system of claim 13, wherein an output of the catalyst bed is operatively coupled to the first tank and the ignition system by a three-way valve.

15. The hypersonic ignition system of claim 14, further comprising a regulator operatively coupled between the catalyst bed and the three-way valve.

16. A hypersonic ignition system, comprising:
a first tank for holding a hydrocarbon fuel;
a plurality of fuel injectors for injecting the hydrocarbon fuel into a combustion chamber;
a second tank for holding a Tridyne gas;
a catalyst bed operatively coupled to the second tank for reacting with and warming the Tridyne gas;
a pressurization system operatively coupled to the catalyst bed for using the warmed Tridyne gas to pressurize the first tank; and
an ignition and barbotage system operatively coupled to the catalyst bed for providing warmed Tridyne gas to the plurality of fuel injectors, wherein the second tank is located inside the first tank.

* * * * *